United States Patent [19]

Gaines

[11] Patent Number: 5,548,279
[45] Date of Patent: Aug. 20, 1996

[54] METHOD AND APPARATUS FOR DETECTING A POWER LINE

[75] Inventor: Robert B. Gaines, Florissant, Mo.

[73] Assignee: McDonnell Douglas Corporation, St. Louis, Mo.

[21] Appl. No.: 279,485

[22] Filed: Jul. 22, 1994

[51] Int. Cl.$^6$ .................................................. G08B 21/00
[52] U.S. Cl. .................... 340/664; 340/660; 340/654; 324/256; 324/117 R; 324/253; 324/255
[58] Field of Search .................................. 340/664, 660, 340/654; 324/133, 67, 256, 253, 254, 255, 117 R

[56] References Cited

U.S. PATENT DOCUMENTS

| | | | |
|---|---|---|---|
| 3,418,572 | 12/1968 | Humphreys, Jr. | 324/67 |
| 4,064,997 | 12/1977 | Holland et al. | 340/685 |
| 4,277,771 | 7/1981 | Chapin et al. | 340/979 |
| 4,649,375 | 3/1987 | Duppong et al. | 340/660 |
| 4,714,915 | 12/1987 | Hascal et al. | 340/657 |
| 5,343,177 | 8/1994 | Williams | 333/213 |

OTHER PUBLICATIONS

Adel S. Sendra and Kenneth C. Smith, *Microelectronic Circuits*, 1982, pp. 80–90.
Roger Melen and Harry Garland, *Understanding IC Operational Amplifiers*, 1982, pp. 100–101.

*Primary Examiner*—John K. Peng
*Assistant Examiner*—Julie B. Lieu
*Attorney, Agent, or Firm*—Bell, Seltzer, Park & Gibson, P.A.

[57] ABSTRACT

A method and apparatus for detecting power lines including a pickup coil for detecting the magnetic field generated by the current conducted by a power line and for producing a sense current in response to the detected magnetic field, a gyrator circuit for generating a sense voltage in response to the sense current and tuning means for producing an output voltage in response to the sense voltage such that a power line can be detected thereby. The tuning means also tunes the power line detecting apparatus to the predetermined frequency of the current conducted by the power lines. The power line detecting method and apparatus also preferably analyzes the magnitude and frequency of the output voltage produced by the tuning means so as to distinguish output voltages generated in response to the magnetic fields produced by power lines from those generated by extraneous electromagnetic noise. In addition, the power line detecting method apparatus can also determine the direction of the detected power lines by sampling successive output voltages as the power line detecting apparatus moves relative to the located power line such that movement of the power line detecting apparatus in a direction generally toward the located power line is detected and a warning or alarm can be produced.

17 Claims, 3 Drawing Sheets

5,548,279

METHOD AND APPARATUS FOR DETECTING A POWER LINE

FIELD OF THE INVENTION

The present invention relates generally to a sensor and, more particularly, to a method and apparatus for detecting a power line.

BACKGROUND OF THE INVENTION

In many instances, it is desirable to detect and identify a power line. For example, it is desirable for aircraft, such as helicopters and airplanes, to detect and avoid power lines. Thus, detectors have been developed and employed on aircraft to detect power lines such that the pilot of the aircraft is alerted if the aircraft is approaching a power line and can make appropriate evasive navigational actions.

One sensor for detecting power lines is illustrated in U.S. Pat. No. 4,277,771 to Lawrey H. Chapin, et al., which issued on Jul. 7, 1981 (the '771 patent). The '771 patent discloses an electric induction field navigation apparatus for detecting power lines and assisting a pilot in guiding an aircraft. The electric induction field navigation apparatus of the '771 patent includes a plurality of field gradient detectors. Each field gradient detector is a parallel plate capacitor which produces a voltage having an amplitude dependent on the gradient of the electric field to which the detector is exposed. Thus, the electric field produced by high voltage power transmission lines can be detected and the aircraft can be guided appropriately.

Another sensor for detecting power lines is disclosed in U.S. Pat. No. 4,649,375 to Denis E. Duppong, et al., which issued on Mar. 10, 1987 (the '375 patent). The sensor of the '375 patent is used in conjunction with construction equipment, such as cranes, which work in the vicinity of electrical power lines. The sensor includes a pickup coil having an elongated laminated core formed of a ferromagnetic material, such as iron, and around which a multi-turn coil of wire is wound. Thus, the magnetic field produced by the current conducted by an electric power line induces a current in the multi-turn coil. The output of the pickup coil, i.e., the induced current, is coupled through an amplifier detector module and is compared to a reference signal to determine if the sensor and, thus, the crane is in the vicinity of a power line.

The sensor of the '375 patent does not, however, determine if the sensor is approaching the detected power line, i.e., if the crane is moving toward the detected power line. Instead, the sensor of the '375 patent detects power lines in its vicinity including, not only the power lines which the sensor, and thus the crane, is approaching, but also power lines which the sensor is not approaching and are therefore not a threat. Thus, the operator of the crane is identified of all power lines in its vicinity including those which the crane is not approaching and for which the operator need not adjust the position of the crane.

A pickup coil having a ferromagnetic core, such as the ferromagnetic core of the sensor of the '375 patent, increases the sensitivity of a sensor in comparison to a sensor having a pickup coil which does not include a ferromagnetic core. However, a ferromagnetic core conducts eddy currents which are also induced within the core by the magnetic field produced by the current conducted by the power lines. The induced eddy currents contribute to the loss of the sensor and, therefore, increase the resistance of the sensor and correspondingly decrease the sensitivity of the sensor.

As known to those skilled in the art, sensors which have a decreased sensitivity detect, not only signals of a desired frequency or within a desired range of frequencies, but also signals within a wider range of frequencies, including extraneous electromagnetic interference or noise having a frequency outside the desired range of frequencies. Likewise, the increased resistance of a sensor will decrease the resulting voltage or output signal of the sensor such that differences between signals produced by the magnetic field generated by power lines and signals produced by extraneous electromagnetic noise will be more difficult to ascertain. Thus, the range or the distance from the power lines at which a sensor is able to detect power lines is also limited by the decreased sensitivity of the sensor.

SUMMARY OF THE INVENTION

It is an object of the present invention to provide a method and apparatus for detecting power lines.

It is another object of the present invention to provide a method and apparatus for determining the location of a power line relative to a sensor.

It is a further object of the present invention to provide a method and apparatus for determining if a sensor is approaching a detected power line.

These and other objects are provided, according to the present invention, by a method and apparatus for detecting power lines including sensing means for detecting the magnetic field generated by a current conducted by the power line and for producing a sense current in response to the detected magnetic field, gyrating means for generating a sense voltage in response to the sense current and tuning means for tuning the power line detecting apparatus to a predetermined frequency and for producing an output voltage in response to the sense voltage such that a power line may be detected thereby. By particularly tuning the power line detecting apparatus to a predetermined frequency, such as the frequency of the current conducted by the power line, i.e., 60 hertz, the sensitivity of the power line detector is further improved.

In one embodiment, the tuning means includes a capacitor having a predetermined capacitance. In another embodiment, the tuning means includes a generalized impedance converter circuit which simulates a capacitor having a predetermined capacitance. The predetermined capacitance is selected to tune the power line detecting apparatus to optimize the detection of the magnetic field generated by a current having a predetermined frequency which is conducted by the power line.

The gyrating means has a predetermined inductance and, in one preferred embodiment, is a gyrator circuit for simulating an inductor. The sensing means preferably includes a pickup coil for conducting the sense current induced therein by the detected magnetic field. In one embodiment, the sensing means further includes a ferrimagnetic core having at least one turn of wire positioned about the ferrimagnetic core. In one advantageous embodiment, the ferrimagnetic core is comprised of ferrite and the wire is comprised of magnet wire.

The power line detecting apparatus also preferably includes power line locating means for analyzing the magnitude and frequency of the output voltage produced by the tuning means such that a power line can be located. In particular, a power line is located if the magnitude of the output voltage is greater than a predetermined noise level and the frequency of the output voltage is within a predetermined range of frequencies.

The power line locating means preferably includes power line direction determining means for sampling successive output voltages of the tuning means as the power line detecting apparatus moves relative to the located power line. Thus, movement of the power line detecting apparatus in a direction generally toward the located power line is detected. In particular, the power line detecting apparatus is moving in a direction generally toward the located power line if the magnitude of the second output voltage sampled is greater than the magnitude of the first output voltage sampled. The power line detecting apparatus can also include warning means for indicating that the power line detecting apparatus is moving in a direction generally toward a located power line.

Accordingly, by particularly tuning the power line detecting apparatus to the predetermined frequency of the current conducted by the power lines, the sensitivity of the power line detecting apparatus of the present invention is enhanced. The sensitivity of the power line detecting apparatus is further improved by its relatively low resistance due to the relatively low resistances of components of the power line detecting apparatus, such as the pickup coil, the gyrator circuit and the tuning means. Due to the enhanced sensitivity of the power line detecting apparatus of the present invention, the magnetic field produced by the current conducted by the power line can be detected without also detecting other electromagnetic signals or noise having a frequency outside of a predetermined range of frequencies.

In addition, one embodiment of the power line detecting method and apparatus of the present invention locates a power line and determines if the power line detecting apparatus is moving in a direction generally toward the located power lines so that an alarm or other warning signal is only generated if the power lines are generally in the path of movement of the power line detecting apparatus. Thus, false alarms due to the detection of power lines in the vicinity of the power line detecting apparatus, but which the power line detecting apparatus is not approaching, are significantly reduced or eliminated.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Figure 1:
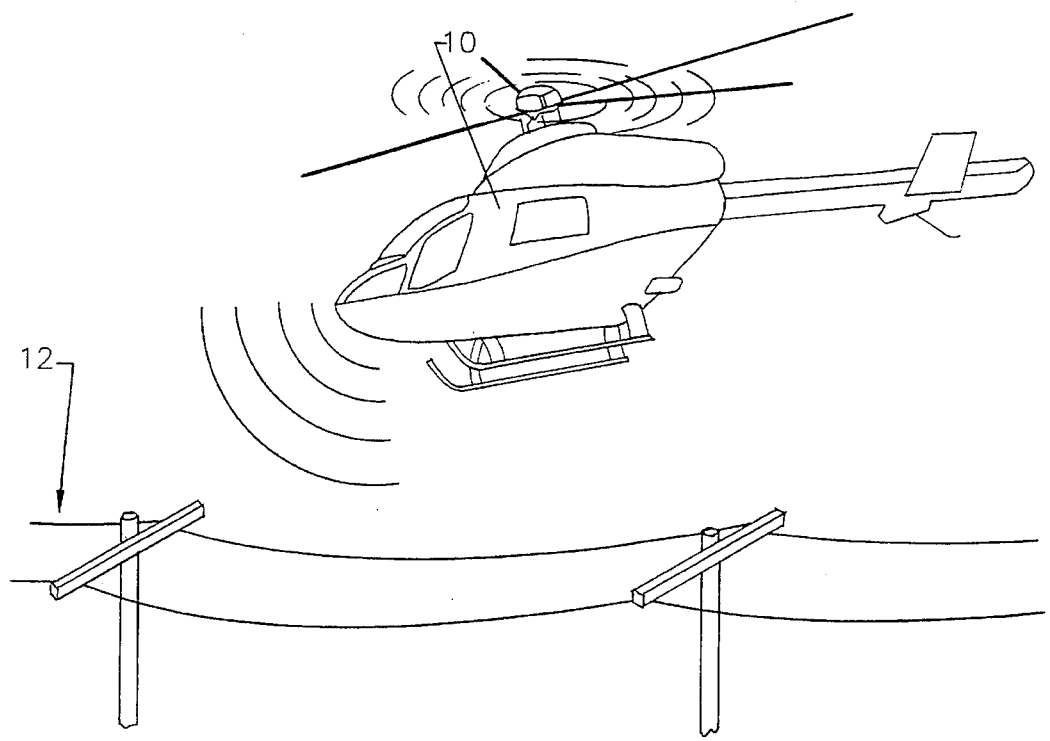
FIG. 1 is a perspective view of an aircraft including the power line detecting apparatus of the present invention which is in the vicinity of a plurality of power lines.

Referring now to FIG. 1, an aircraft 10 which includes a power line detecting apparatus according to the present invention is illustrated in the vicinity of power lines 12, such as electrical transmission power lines. While the power line detecting apparatus is illustratively mounted within a helicopter, the power line detecting apparatus can be mounted on a variety of platforms, such as airplanes or other aircraft, without departing from the spirit and scope of the present invention.

Figure 2:
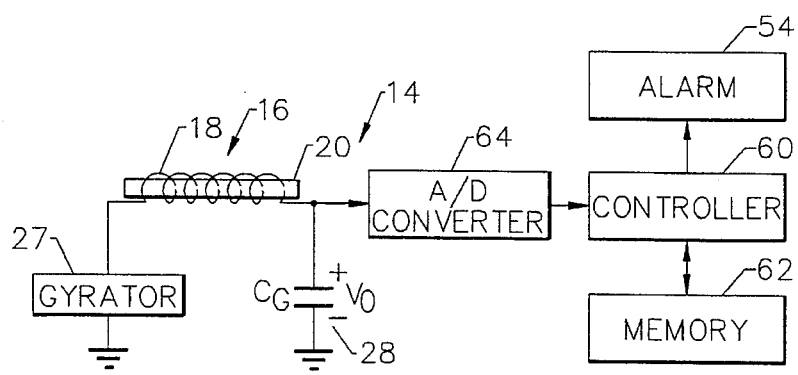
FIG. 2 is an electrical schematic view of one embodiment of a power line detecting apparatus of the present invention.
Figure 3:
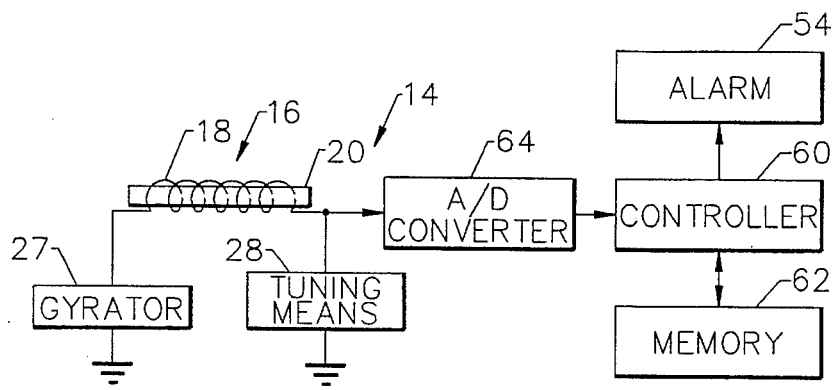
FIG. 3 is an electrical schematic, partially in block diagram form, of another embodiment of a power line detecting apparatus of the present invention.

Two embodiments of the power line detecting apparatus 14 of the present invention are illustrated in partial block diagram form in FIGS. 2 and 3. The power line detecting apparatus 14 includes sensing means 16 for detecting the magnetic field generated by the current conducted by the power lines 12. The sensing means 16 also produces a sense current in response to the detected magnetic field.

As shown, the sensing means 16 preferably includes a pickup coil in which the sense current is induced by the magnetic field. The pickup coil includes at least one turn of wire be which is preferably positioned about a ferromagnetic core 20. The at least one turn of wire be is preferably comprised of magnet wire having an enamel insulating layer and, more preferably, is comprised of AWG14 magnet wire. While a plurality of turns of wire 18 about the core 20 are shown in FIGS. 2 and 3, one embodiment of the pickup coil includes only a limited number of turns of wire such that the length of the wire is minimized and the corresponding resistance of the wire is decreased. For example, in one embodiment, the pickup coil has three layers of AWG14 magnet wire, a coil length of 0.09 meters, an inside coil diameter of 0.005 meters and a resulting resistance of 0.1Ω.

The pickup coil also preferably includes a ferrimagnetic oxide core 20 which does not conduct significant eddy currents in response to the surrounding magnetic field. Since eddy currents are not induced within a ferrimagnetic oxide core 20, the resistance and loss of the power line detecting apparatus 14 of the present invention is decreased and the sensitivity of the power line detecting apparatus is correspondingly increased.

The ferrimagnetic oxide core 20 is preferably formed of a ferrite material having a chemical formula of $MeFeO_4$ wherein Me represents one or more divalent transition metals such as Mn, Fe, Co, Ni, a compound of Cu and Zn or a compound of Mg and Cd. More preferably, the ferrite material is selected from the group of manganese zinc transition metals. For example, the ferrimagnetic oxide core 20 can be formed of N22, N27, N47 or N48 ferrite compounds which are sold by Siemens Components of Iselin, N.J. The length and diameter of the ferrimagnetic oxide core can also be varied. However, in one embodiment, the length of the core is 0.1 meters and the diameter of the core is 0.005 meters.

The power line detecting apparatus of the present invention also includes gyrating means 27, responsive to the sensing means 16, for generating a sense voltage in response to the sense current. In one embodiment, the gyrating means 27 includes a generalized impedance converter circuit 24 configured as a gyrator circuit for simulating an inductor. By simulating an inductor, the gyrator circuit allows the surrounding magnetic field to be sensed with a pickup coil having relatively few coils, thereby reducing the resistance of the power line detecting apparatus 14.

Figure 4:
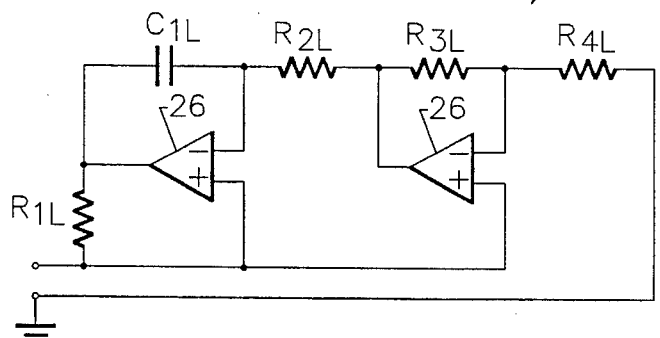
FIG. 4 is an electrical schematic of a gyrator circuit according to the present invention.

As shown in FIG. 4, the gyrator circuit 24 preferably includes first and second interconnected operational amplifiers 26. The first and second operational amplifiers 26 are interconnected by a network of four resistors, namely, $R_{1L}$, $R_{2L}$, $R_{3L}$ and $R_{4L}$, and a capacitor $C_{1L}$. The gyrator circuit 24 thus has a predetermined inductance $L_G$ which is computed as follows:

$$L_G = \frac{R_{1L} R_{2L} R_{4L} C_{1L}}{R_{3L}} \quad (1)$$

In addition, the gyrator circuit has an extremely low resistance. For example, for an embodiment of a gyrator circuit in which $R_{1L}$ is 99 Ω, $R_{2L}$ is 747 Ω, $R_{3L}$ is 3280 Ω, $R_{4L}$ is 472 Ω and $C_{1L}$ is 0.33 µF, the magnitude of the resistance is at least three orders of magnitude less than the resistance of the pickup coil, i.e., 0.1 Ω. Thus, the gyrator circuit produces a sense voltage in response to the sense current without introducing significant resistance and loss to the power line detecting apparatus of the present invention.

The power line detecting apparatus also includes tuning means 28, responsive to the sensing means 16 and the gyrating means 27, for tuning the power line detecting apparatus 10 to a predetermined frequency. The tuning means 28 also produces an output voltage in response to the sense voltage such that a power line 12 can be detected thereby. In the embodiment illustrated in FIG. 2, the tuning means 28 includes a capacitor 30 having a predetermined capacitance for tuning the power line detecting apparatus to optimize the detection of the magnetic field generated by a current having the predetermined frequency which is conducted by the power line. Typically, the current conducted by the power line has a frequency of 50 hertz or 60 hertz. In addition, the capacitor is preferably non-polar and has a relatively small dissipation factor, such as 0.05, for example.

Figure 5:
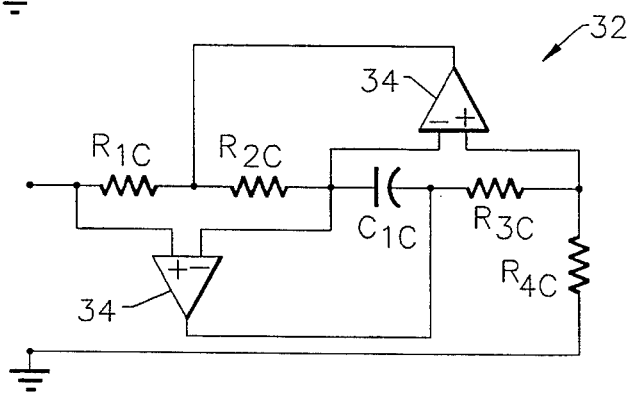
FIG. 5 is an electrical schematic of one embodiment of the tuning means of the power line detecting apparatus of the present invention.

In another embodiment illustrated in FIG. 3 and in more detail in FIG. 5, the tuning means 28 includes a generalized impedance converter circuit 32 for simulating a capacitor. As shown in FIG. 5, the generalized impedance converter circuit 32 also includes two operational amplifiers 34 interconnected by a network of four resistors, namely, $R_{1C}$, $R_{2C}$, $R_{3C}$ and $R_{4C}$ and a capacitor $C_{1C}$. The generalized impedance converter circuit has a predetermined capacitance $C_G$ which is computed as follows:

$$C_G = \frac{R_{2C} R_{3C} C_{1C}}{R_{1C} R_{4C}} \quad (2)$$

In addition, the generalized impedance converter circuit 32 of FIG. 5 also has an extremely low resistance. For example, in a preferred embodiment in which $R_{1C}$ is 99.1 Ω, $R_{2C}$ is 994 Ω, $R_{3C}$ is 3050 Ω, $R_{4C}$ is 99.2 Ω and $C_1$ is 0.325 µF, the magnitude of the resistance of the generalized impedance converter circuit 32 is also at least three orders of magnitude less than the resistance of the pickup coil, i.e. 0.1 Ω. Thus, the generalized impedance converter circuit 32 produces an output voltage in response to the sense voltage such that a power line 12 can be detected without significantly increasing the resistance and without correspondingly significantly decreasing the sensitivity of the power line detecting apparatus 14 of the present invention.

According to the present invention, the tuning means tunes the power line detecting apparatus 14 to a predetermined resonant frequency $f_C$ based upon the total inductance $L_T$ and total capacitance $C_G$ of the power line detecting apparatus as follows:

$$f_C = \frac{1}{2\pi (L_T C_G)^{1/2}} \quad (3)$$

Thus, while the capacitor of the tuning means comprises the total capacitance of the power line detecting apparatus 14, the total inductance $L_T$ includes components due to the gyrator circuit 24 and the pickup coil. In particular, the total inductance $L_T$ can be determined as follows:

$$L_T = L_G + L_P \quad (4)$$

Wherein $L_P$ is the inductance of the pickup coil. The pickup coil inductance is determined as follows:

$$L_P = \frac{F \mu_o N^2 (\mu_r A_r + A_c - A_r)}{l_c} \quad (5)$$

wherein $\mu_o$ is the permeability of free space, i.e., $4\pi \times 10^{-7}$ henrys/m; N is the number of turns of wire about the core of the pickup coil; $\mu_r$ is the relative permeability of the core 20 of the pickup coil, such as 500 for a core comprised of an N27 ferrite compound and having a length to diameter ratio of 40:1; $A_r$ is the cross-sectional area of the wire coil in meters squared; $A_c$ is the cross-sectional area in meters squared of the core of the pickup coil and $l_c$ is the length of the wire in meters. In addition, F is dependent upon the ratio of the coil length to the length of the core 20, $\beta$, and may be determined as follows:

$$F = 0.253\beta^3 - 1.220\beta^2 + 1.619\beta + 0.0625 \quad (6)$$

Accordingly, the inductance $L_G$ of the gyrator circuit 24 and the capacitance $C_G$ of the tuning means can be selected such that the power line detecting apparatus 14 of the present invention is tuned to the frequency of the current conducted by the power lines to be detected, i.e., 60 hertz.

The power line detecting apparatus 14 of the present invention can also include power line locating means, responsive to the tuning means 28, for analyzing the magnitude and frequency of the output voltage produced by the tuning means to thereby locate the power line 12 conducting the current which generates the detected magnetic field. In particular, the power line locating means compares the magnitude of the output voltage to a predetermined noise level. The predetermined noise level is selected such that output voltages have a magnitude greater than the predetermined noise level which are typically produced in response to the magnetic field generated by the current conducted by a power line. Correspondingly, output voltages which have a magnitude less than the predetermined noise level are generally produced in response to other extraneous sources of electromagnetic noise or interference. Thus, output voltages produced in response to the magnetic field generated by the current conducted by a power line can be distinguished from the output voltages produced in response to extraneous electromagnetic noise.

The power line locating means also preferably compares the frequency of the output voltage to a predetermined range of frequencies. The predetermined range of frequencies extends from a predetermined minimum frequency $f_{MIN}$ to a predetermined maximum frequency $f_{MAX}$. This range of frequencies is preferably centered about the predetermined resonant frequency $f_C$ of the power line detecting apparatus 14. Thus, in one embodiment in which the resonant frequency $f_C$ is 60 hertz, the predetermined maximum and minimum frequencies are 59.4 hertz and 60.6 hertz, respectively. Therefore, magnetic fields which induce currents having a frequency within the predetermined range of frequencies, such as those generated by currents conducted by power lines, can be detected and distinguished from extraneous electromagnetic interference having frequencies outside of the predetermined range.

Accordingly, output voltages having a magnitude which exceeds a predetermined noise level $V_{MIN}$ and having a frequency within a predetermined range of frequencies, such as those produced in response to the magnetic field generated by the currents conducted by a power line, are detected. The power line which is the source of the magnetic field is thereby located by the power line detecting apparatus 14 of the present invention.

Figure 6:
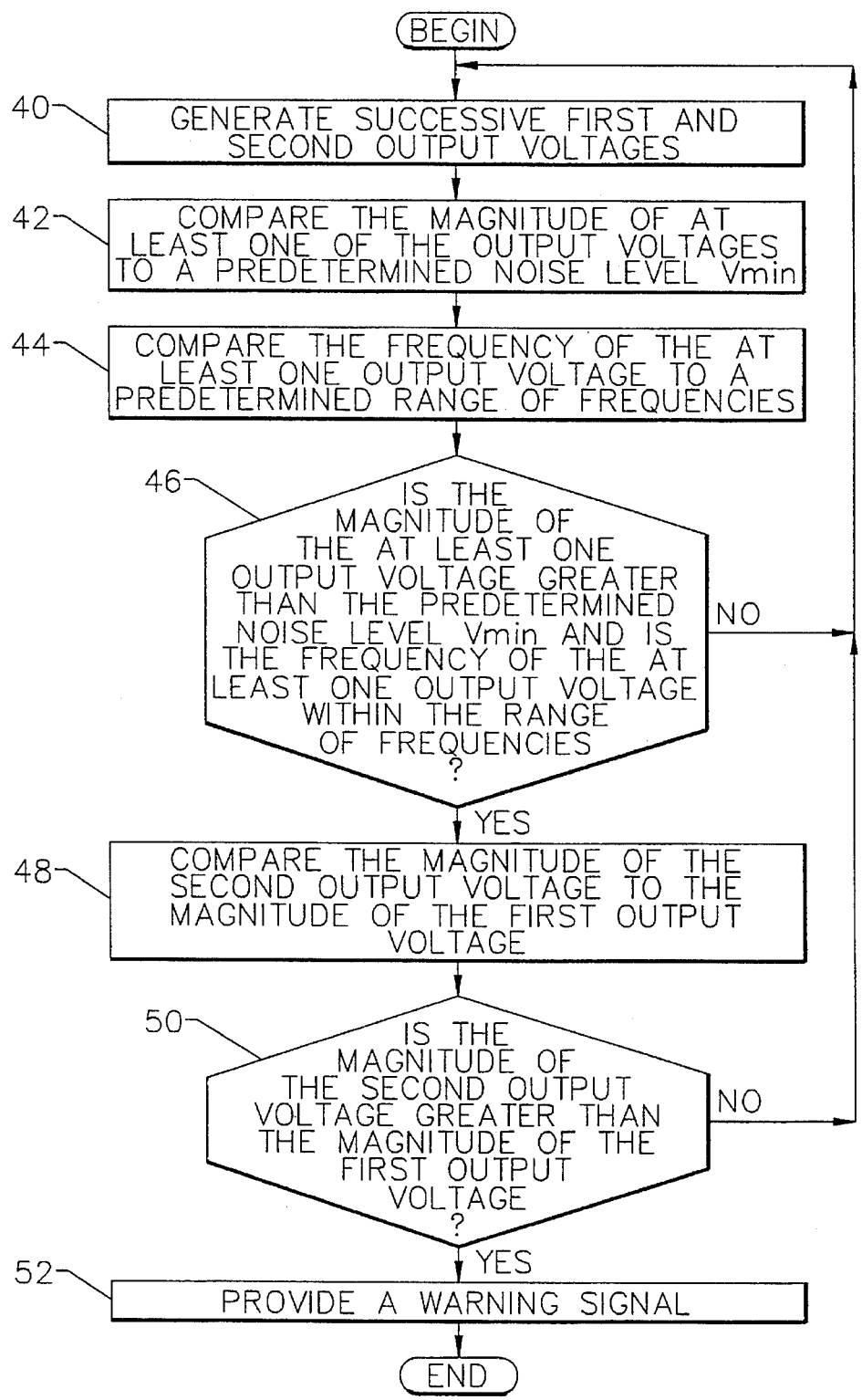
FIG. 6 is a flow chart, in block diagram form, of the operations of the power line detecting method and apparatus of the present invention.

The power line locating means also preferably includes power line direction determining means for detecting movement of the power line detecting apparatus in a direction generally toward the located power line. As illustrated in blocks 40 and 44 of FIG. 6, the power line detecting apparatus 14 generates successive first and second output voltages which are sampled by the power line direction determining means. As described above and shown in block 42, the power line locating means compares the magnitude of at least one of the output voltages to a predetermined noise level $V_{MIN}$ and compares the frequency of the at least one output voltage to a predetermined range of frequencies. If the magnitude of the at least one output voltage is less than the predetermined noise level $V_{MIN}$ or the frequency of the at least one output voltage is outside of the range of frequencies, a power line is not located and the power line detecting apparatus 14 continues to generate successive output voltages as shown in block 46.

If, however, the magnitude of the at least one output voltage is greater than the predetermined noise level $V_{MIN}$ and the frequency of the at least one output voltage is within the range of frequencies, a power line is located and the power line direction determining means then compares the magnitude of the second output voltage to the magnitude of the first output voltage as illustrated in block 48. If the magnitude of the second output voltage is not greater than the magnitude of the first output voltage, the power line detection apparatus 14 of the present invention continues to generate output voltages based upon a sensed magnetic field as shown in block 50 and no warning or alert is provided since the power line detection apparatus is not moving in a direction generally toward the detected power line. If the magnitude of the second output voltage is greater than the magnitude of the first output voltage, however, a warning signal is preferably provided, such as by a warning means or alarm 54 including an indicator light or an auditory signal, since the power line detecting apparatus 14 is moving in a direction generally toward the located power line as shown in block 52 and explained hereinafter.

The magnetic field generated by a current conducted by a power line and, correspondingly, the magnitude of the output voltage $V_O$ produced by the power line detecting apparatus 14 in response to the magnetic field varies according to the inverse of the square of the distance d between the power line detecting apparatus 14 and a located power line 12 as follows:

$$V_o \alpha \frac{1}{d^2} \quad (7)$$

Thus, in instances in which the magnitude of the second output voltage is greater than the magnitude of the first output voltage, the power line detecting apparatus 14 is moving in a direction generally toward the located power line. Accordingly, a warning is preferably only provided in instances in which a power line is detected and it is further determined that the power line detection apparatus 14 is moving in a direction generally toward the power line 12. Thus, false alarms are significantly reduced or eliminated for power lines which are detected, but which the power line detecting apparatus 14 is not approaching, i.e., power lines which are not within the flight path of the aircraft on which the power line detecting apparatus 14 of the present invention is mounted.

As illustrated in FIG. 2 and 3, the power line locating means including the power line direction determining means typically include a controller 60, such as a microprocessor or microcontroller, an associated memory device 62, such as electrically programmable read only memory (EPROM). In addition, an analog to digital (A/D) convertor 64 is also generally associated with the controller 60 to covert the analog output voltages, including both the magnitude and frequency of the output voltage, to a digital representation.

The resistance of each component of the power line detecting apparatus 14 of the present invention is minimized and, consequently, the losses introduced by the components are minimized so as to improve the performance of the power line detecting apparatus 14. By minimizing the overall resistance of the power line detecting apparatus 14, the sensitivity of the power line detecting apparatus is thereby improved. In particular, the sensitivity of the power line detecting apparatus is improved such that the magnetic field generated by the current conducted by a power line is detected, but extraneous electromagnetic noise is not detected.

Figure 7:
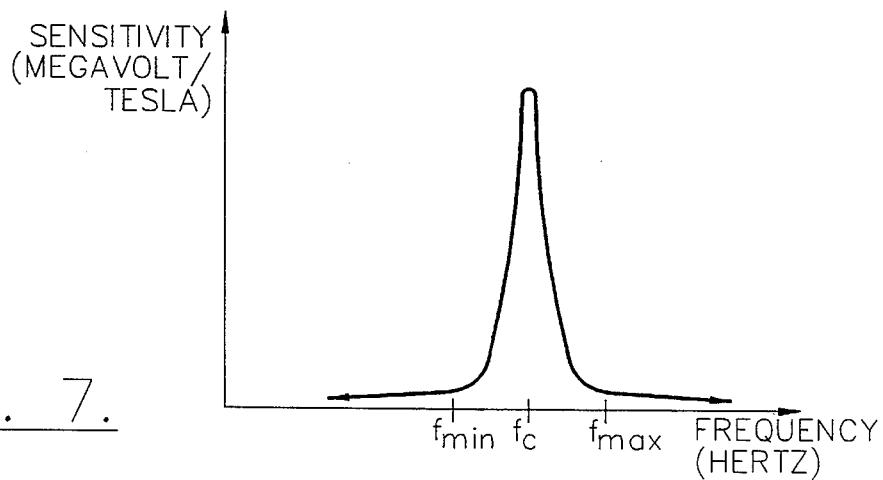
FIG. 7 is a graph illustrating the relationship between the normalized sensitivity of the power line detecting apparatus of the present invention and the frequency of the detected signal.

A graph illustrating the normalized sensitivity of the power line detecting apparatus 14 is illustrated in FIG. 7. As shown, the sensitivity is acute within the predetermined range of desired frequencies centered about the predetermined center frequency fc. Outside of this predetermined range of frequencies, the sensitivity of the power line detecting apparatus 14 is significantly reduced such that extraneous electromagnetic noise and interference is not detected.

In addition, by decreasing the resistance and increasing the sensitivity of the power line detecting apparatus of the present invention, the range of the power line detecting apparatus is improved significantly. In particular, the range, i.e., the distance from the power lines at which the power line detecting apparatus of the present invention can detect the power lines, is significantly increased since the power line detecting apparatus is particularly tuned to the frequency of the current conducted by the power lines such that extraneous electromagnetic noise of other frequencies is not detected. By increasing the range, power lines which the power line detecting apparatus of the present invention is approaching can be detected from increased distances and warnings may be provided such that evasive navigational action can be taken well in advance of the power lines.

In the drawings and specifications, there has been set forth a preferred embodiment of the invention, and although specific terms are employed, they are used in generic and descriptive sense only and not for purpose of limitation.

What is claimed is:

1. An apparatus for detecting a power line comprising:

sensing means for detecting a magnetic field generated by a current conducted by the power line and for producing a sense current in response to the detected magnetic field;

gyrating means, responsive to said sensing means, for generating a sense voltage in response to the sense current wherein said gyrating means has a predetermined inductance;

tuning means, responsive to said sensing means and said gyrating means, for tuning the power line detecting apparatus to a predetermined frequency and for producing a plurality of successive output voltages in response to the sense voltage such that a power line may be detected thereby, power line direction determining means for sampling successive output voltages of said tuning means as the power line detecting apparatus moves relative to the power line to thereby differentiate between movement of the power line detecting apparatus in a direction generally toward the power line and movement of the power line detecting apparatus in a direction generally away from the power line, wherein said power line direction determining means detects movement in a direction generally toward the power line if the magnitude of any one of the successive output voltages is greater than the magnitude of the immediately preceding output voltage, and wherein said power line direction determining means detects movement in a direction generally away from the power line if the magnitude of any one of the successive output voltages is less than the magnitude of the immediately preceding output voltage; and warning means, responsive to said power line direction determining means, for providing a warning signal in response to the detection of movement of the power line detecting apparatus in a direction generally toward the power line, but not in response to the detection of movement of the power line detecting apparatus in a direction generally away from the power line.

2. A power line detecting apparatus according to claim 1 wherein said gyrating means comprises a gyrator circuit for simulating an inductor.

3. A power line detecting apparatus according to claim 1 wherein said tuning means comprises a capacitor having a predetermined capacitance for tuning the power line detecting apparatus to optimize the detection of the magnetic field generated by a current having a predetermined frequency which is conducted by the power line.

4. A power line detecting apparatus according to claim 1 wherein said tuning means comprises a generalized impedance converter circuit for simulating a capacitor having a predetermined capacitance for tuning the power line detecting apparatus to optimize the detection of the magnetic field generated by a current having a predetermined frequency which is conducted by the power line.

5. A power line detecting apparatus according to claim 1 wherein said sensing means includes a pickup coil for conducting the sense current induced therein by the detected magnetic field.

6. A power line detecting apparatus according to claim 5 wherein said pickup coil includes a ferrimagnetic oxide core and at least one turn of wire positioned about the ferrimagnetic oxide core.

7. A power line detecting apparatus according to claim 6 wherein said ferrimagnetic oxide core is comprised of ferrite and wherein said at least one turn of wire is comprised of magnet wire.

8. A power line detecting apparatus according to claim 1 further comprising power line locating means, responsive to said tuning means, for analyzing the magnitude and frequency of the output voltage produced by said tuning means to thereby locate the power line conducting the current which generates the detected magnetic field.

9. An apparatus for detecting a power line conducting a current, the power line detecting apparatus comprising:

a pickup coil for detecting a magnetic field generated by the current conducted by the power line and for producing a sense current in response to the detected magnetic field;

a gyrater circuit, responsive to said pickup coil, for generating a sense voltage in response to the sense current wherein said gyrater circuit has a predetermined inductance;

tuning means, responsive to said pickup coil and said gyrater circuit, for tuning the power line detecting apparatus to a predetermined frequency and for producing an output voltage in response to the sense voltage, wherein said tuning means comprises a generalized impedance converter circuit for simulating a capacitor having a predetermined capacitance for tuning the power line determining apparatus to optimize the detection of the magnetic field generated by a current having a predetermined frequency which is conducted by the power line; and power line locating means, responsive to said tuning means, for analyzing the magnitude and frequency of the output voltage produced by said tuning means to thereby locate the power line conducting the current which generates the detected magnetic field, wherein said power line locating means further comprises power line direction determining means for sampling successive output voltages of said tuning means as the power line detecting apparatus moves relative to the located power line to thereby detect movement of the power line detecting apparatus in a direction generally toward the located power line.

10. A power line detecting apparatus according to claim 9 wherein said tuning means comprises a capacitor having a predetermined capacitance for tuning the power line detecting apparatus to optimize the detection of the magnetic field generated by a current having a predetermined frequency which is conducted by the power line.

11. A power line detecting apparatus according to claim 9 wherein said pickup coil includes a ferrimagnetic oxide core and at least one turn of wire positioned about the ferrimagnetic oxide core.

12. A power line detecting apparatus according to claim 11 wherein said ferrimagnetic oxide core is comprised of ferrite and wherein said at least one turn of wire is comprised of magnet wire.

13. A power line detecting apparatus according to claim 9 further comprising warning means, responsive to said power line direction determining means, for indicating that the power line detecting apparatus is moving in a direction generally toward the located power line.

14. A method for detecting a power line from a platform in motion, the method comprising the steps of:

generating a plurality of successive output voltages having a respective magnitude and a respective frequency related to a magnetic field generated by a current conducted by the power line;

comparing the magnitude of at least one of the output voltages to a predetermined noise level and comparing the frequency of the at least one output voltage to a predetermined range of frequencies;

detecting the power line if the magnitude of the at least one output voltage is greater than the predetermined noise level and the frequency of the at least one output voltage is within the predetermined range of frequencies;

comparing the magnitude of each output voltage to the magnitude of an immediately preceding output voltage if a power line has been detected by said power line detecting step;

detecting movement of the platform in a direction generally toward the detected power line if the magnitude of any one of the successive output voltages is greater than the magnitude of the immediately preceding output voltage;

detecting movement of the platform in a direction generally away from the detected power line if the magnitude of any one of the successive output voltages is less than the magnitude of the immediately preceding output voltage: and providing a warning signal in response to detecting movement of the platform in a direction generally toward the power line, but not in response to detecting movement of the platform in a direction generally away from the power line.

15. An apparatus for detecting a power line conducting a current, the power line detecting apparatus comprising:

a pickup coil for detecting a magnetic field generated by the current conducted by the power line and for producing a sense current in response to the detected magnetic field, said pickup coil extending between opposed first and second ends;

a gyrator circuit, electrically connected between the first end of said pickup coil and a reference voltage, for generating a sense voltage in response to the sense current;

a tuning circuit, electrically connected between the second end of said pickup coil and the reference voltage, for tuning the power line detecting apparatus to a predetermined frequency and for producing an output voltage in response to the sense voltage, wherein said tuning circuit comprises a generalized impedance converter circuit for simulating a capacitor having a predetermined capacitance for tuning the power line detecting apparatus to optimize the detection of the magnetic field generated current having a predetermined frequency which is conducted by the power line; and a controller, responsive to said tuning circuit, for analyzing the magnitude and frequency of the output voltage produced by said tuning circuit to thereby locate the power line conducting the current which generates the detected magnetic field, wherein said controller comprises power line direction determining means for sampling successive output voltages of said tuning circuit as the power line detecting apparatus moves relative to the located power line to thereby detect movement of the power line detecting apparatus in a direction generally toward the located power line.

16. A power line detecting apparatus according to claim 15 wherein said tuning circuit comprises a capacitor having a predetermined capacitance for tuning the power line detecting apparatus to optimize the detection of the magnetic field generated by a current having a predetermined frequency which is conducted by the power line.

17. A power line detecting apparatus according to claim 15 further comprising warning means, responsive to said power line direction determining means, for indicating that the power line detecting apparatus is moving in a direction generally toward the located power line.

* * * * *